(12) United States Patent
Leuer et al.

(10) Patent No.: US 11,852,190 B2
(45) Date of Patent: Dec. 26, 2023

(54) PLAIN BEARING BUSH FOR PLAIN BEARINGS WITH INCREASED LOAD-BEARING CAPACITY

(71) Applicant: Flender GmbH, Bocholt (DE)

(72) Inventors: Philipp Leuer, Essen (DE); Robert Prusak, Gelsenkirchen (DE); Eugen Schlegel, Oberhausen (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/025,120

(22) PCT Filed: Sep. 20, 2021

(86) PCT No.: PCT/EP2021/075743
§ 371 (c)(1),
(2) Date: Mar. 7, 2023

(87) PCT Pub. No.: WO2022/063710
PCT Pub. Date: Mar. 31, 2022

(65) Prior Publication Data
US 2023/0304531 A1    Sep. 28, 2023

(30) Foreign Application Priority Data
Sep. 24, 2020   (EP) ..................... 20198055

(51) Int. Cl.
F16C 17/02        (2006.01)
F16C 33/10        (2006.01)
(Continued)

(52) U.S. Cl.
CPC ............... F16C 17/02 (2013.01); F03D 9/25 (2016.05); F03D 15/00 (2016.05); F03D 80/70 (2016.05);
(Continued)

(58) Field of Classification Search
CPC .. F16C 17/02; F16C 33/1045; F16C 2360/31; F16H 1/28; F16H 2057/085; H02K 7/116; H02K 7/1838
See application file for complete search history.

(56) References Cited

U.S. PATENT DOCUMENTS 4,371,219 A       2/1983   Yamane
2015/0330381 A1*  11/2015  Ren ..................... F16C 33/1085
                                              417/374
(Continued)

FOREIGN PATENT DOCUMENTS

CN       105134780 A     12/2015
DE       29 45 821        5/1980
(Continued)

OTHER PUBLICATIONS

English translation of the Written Opinion of the International Searching Authority in PCT/EP2021/075743, as published and available on PatentScope as of Mar. 24, 2023. (Year: 2023).*

(Continued)

*Primary Examiner* — Tulsidas C Patel
*Assistant Examiner* — Thomas K Quigley
(74) *Attorney, Agent, or Firm* — Henry M. Feiereisen LLC

(57) ABSTRACT

A plain bearing bush includes a cylindrical main body having a first shell surface and a second shell surface. The first and second shell surfaces include a plurality of exchange bores for a lubricant. At least one of the exchange bores has a first diameter on the first shell surface and a second diameter on the second shell surface, with the second diameter being greater than the first diameter for an increase in a load-bearing capability of the plain bearing bush. Two (Continued)

of the exchange bores are arranged in axial spaced-apart relation and connected to one another by a pocket depression.

16 Claims, 6 Drawing Sheets

(51) Int. Cl.
    *H02K 7/116*     (2006.01)
    *H02K 7/18*     (2006.01)
    *F16H 1/28*     (2006.01)
    *F03D 15/00*     (2016.01)
    *F03D 80/70*     (2016.01)
    *F03D 9/25*     (2016.01)
    *F16H 57/08*     (2006.01)

(52) U.S. Cl.
    CPC .......... *F16C 33/1045* (2013.01); *F16H 1/28* (2013.01); *H02K 7/116* (2013.01); *H02K 7/1838* (2013.01); *F05B 2220/706* (2013.01); *F05B 2240/50* (2013.01); *F05B 2260/40311* (2013.01); *F16C 2360/31* (2013.01); *F16H 2057/085* (2013.01)

(56) References Cited

U.S. PATENT DOCUMENTS

| | | | |
|---|---|---|---|
| 2018/0258843 A1* | 9/2018 | Begin | F16C 33/6685 |
| 2018/0283269 A1* | 10/2018 | Wu | F01D 25/186 |
| 2019/0136907 A1* | 5/2019 | Gaulier | F16C 33/107 |

FOREIGN PATENT DOCUMENTS

| | | |
|---|---|---|
| DE | 35 37 449 A1 | 1/1987 |
| DE | 102017216192 A1 | 3/2019 |
| DE | 102017223390 A1 | 6/2019 |

OTHER PUBLICATIONS

International Search Report dated Nov. 3, 2021 by the European Patent Office in International Application PCT/EP2021/075743.

* cited by examiner

PLAIN BEARING BUSH FOR PLAIN BEARINGS WITH INCREASED LOAD-BEARING CAPACITY

CROSS-REFERENCES TO RELATED APPLICATIONS

This application Is the U.S. National Stage of International Application No. PCT/EP2021/075743, filed Sep. 20, 2021, which designated the United States and has been published as International Publication No. WO 2022/063710 A1 and which claims the priority of European Patent Application, Serial No. 20198055.4, flied Sep. 24, 2020, pursuant to 35 U.S.C. 119(a)-(d).

BACKGROUND OF THE INVENTION

The invention relates to a plain bearing bush, by way of which a load-bearing capability of a plain bearing can be increased. The invention likewise relates to a corresponding plain bearing and to a planetary transmission which is equipped with a plain bearing of this type. Furthermore, the invention relates to a wind power plant and an industrial application which in each case have a planetary transmission of this type. The invention likewise relates to a computer program product, by way of which the operating behavior of a corresponding plain bearing bush can be simulated.

Document DE 29 45 821 A1 discloses a bearing which comprises a bearing body, in which a floating bush is arranged rotatably. A shaft is received rotatably in a floating bush. Radially oriented channels are configured in the floating bush, through which channels oil can be fed. The channels are of widened configuration on a side which faces the oil supply.

Laid-open specification DE 35 37 449 A1 has disclosed a bearing system with floating bushes which have radial bores, via which oil can be fed in the direction of a rotatably mounted shaft. Here, the radial bores are of widened configuration at an end which faces the oil supply.

U.S. Pat. No. 4,371,219 A has disclosed a cylindrical plain bearing bush with exchange bores for lubricant which run in the radial direction, in the case of which plain bearing bush the exchange bores have a greater diameter on a radially outer shell surface of the plain bearing bush down on a radially inner shell surface of the plain bearing bush.

CN 105 134 780 A has disclosed a cylindrical plain bearing bush with exchange bores for lubricant which run in the radial direction, in the case of which cylindrical plain bearing bush the exchange bores have a greater diameter on a radially inner shell surface of the plain bearing bush than on a radially outer shell surface of the plain bearing bush.

DE 10 2017 216 192 A1 has disclosed a radial plain bearing for mounting a shaft, the radial plain bearing having a cylindrical plain bearing bush with exchange bores for lubricant which run in the radial direction.

DE 10 2017 223 390 A1 has disclosed a radial plain bearing for mounting a shaft of a transmission for a wind power plant, the radial plain bearing having a cylindrical plain bearing bush.

Plain bearings are used in a multiplicity of applications which require a high bearing load-bearing capability, minimum bearing friction losses and a high bearing service life. A simple and cost-efficient production of plain bearings of this type is likewise sought. There is a requirement for a plain bearing which provides an improvement in at least one of the above-described objectives.

SUMMARY OF THE INVENTION

The addressed object is achieved by way of a plain bearing bush as set forth hereinafter. Preferred refinements are specified in the subclaims in the following description, which preferred refinements can represent one aspect of the invention in each case individually or in combination. If one feature is shown in combination with another feature, this serves only for simplified illustration of the invention and is not in any way to mean that this feature cannot be a development of the invention even without the other feature.

The plain bearing bush according to the invention comprises a cylindrical main body. The cylindrical main body has a first shell surface and a second shell surface. The first and second shell surface are connected to one another via a plurality of supply bores, with the result that the lubricant can pass through a supply bore from the first to the second shell surface and vice versa. At least one of the exchange bores has a first diameter on the first shell surface and a second diameter on a second shell surface. Here, the diameter is to be understood to be a dimension substantially perpendicularly with respect to a flow direction of the lubricant. The second diameter is greater than the first diameter. As a result, a flow speed of the lubricant is lower on the second shell surface than on the first shell surface. Furthermore, there is an increased flow resistance in regions of the exchange bores with the second diameter. As a consequence, there is a higher drag action of the lubricant on the plain bearing bush. An increased lubricating gap height can in turn be achieved by way of the increased drag action. Therefore, an increased load-bearing capability of the plain bearing, in which the plain bearing bush is to be used, is achieved by way of the second diameter which is greater than the first diameter. Exchange bores with different diameters on the first and second shell surface can be produced in a simple way. The drag action is increased and the load-bearing capability is enhanced by way of the modified geometry.

In the case of the claimed plain bearing bush, the at least one exchange bore is arranged offset axially with respect to a lubricant feed opening. Here, an axial direction is to be understood to be a direction substantially parallel to the main rotational axis of the plain bearing bush. The lubricant feed opening is configured in a component of the plain bearing, which component lies opposite the plain bearing bush. Lubricant which is conducted through the at least one exchange bore therefore flows along on the first shell surface before it reaches the at least one exchange bore. The exchange bores are correspondingly arranged in such a way that lubricant is output in a laminar manner on the second shell surface. In particular, the exchange bores can be offset axially with respect to main bores which have a greater diameter than the exchange bores and which are arranged so as to lie substantially opposite a lubricant feed opening.

Moreover, at least two, in particular three or more exchange bores which are spaced apart axially on the second shell surface which is, in particular, the outer surface of the main body are connected to one another by way of a pocket depression. In the region of the pocket depression, the flow speed of the lubricant is decreased further and represents an additional flow resistance, with the result that the drag action on the plain bearing bush is increased further. The pocket depressions can be produced by way of machining methods with or without the removal of material and/or by way of mechanical and/or chemical action. The pocket depressions can be produced, in particular, by way of milling, etching or eroding. The load-bearing capability of the claimed plain bearing bush is increased further by means of the pocket depressions. Furthermore, a plurality of pocket depressions can be configured on the second shell surface, which pocket depressions can be arranged circumferentially to form an arrowhead pattern or arc pattern. For example, the pocket depressions can be oriented in such a way that an arrow tip which points in or counter to the circulating direction is indicated on the second shell surface in a middle region of the plain bearing bush. The arrow pattern can be configured along an intended rotational direction of the plain bearing bush or counter to this rotational direction. As a result, an improved lubricant supply can be achieved on the second shell surface, and more uniform running of the plain bearing bush can be ensured.

The pocket depressions can be configured, for example, as a channel and/or groove which is open so as to point away from the first shell surface. The pocket depression can have, for example, a rounded (in particular, substantially U-shaped) or rectangular flow cross section in the direction of the exchange bores which are connected to one another via the pocket depression. For example, the respective pocket depression runs in a beveled manner with respect to the axial direction and with respect to the circumferential direction of the main body on a substantially constant radius with respect to an axial center line of the cylindrical main body. In particular, at least part of the pocket depressions which are provided in a common axial region of the main body, preferably all the pocket depressions which are provided in the common axial region of the main body, run in parallel to one another in a developed illustration of the main body. In one embodiment of the claimed plain bearing bush, at least two pocket depressions which follow one another in the circumferential direction are connected to one another for an exchange of lubricant. The pocket depressions which are connected to one another can run at an angle with respect to one another, one of the exchange bores opening, in particular, in the one and in the other pocket depression. The common exchange bore is preferably positioned in a point of an imaginary angle of the pocket depressions which are connected to one another in an angular manner. As a result, it is possible that the pocket depressions which are connected to one another configure a zigzag pattern which is preferably of closed configuration in the circumferential direction.

In one embodiment of the claimed plain bearing bush, the first shell surface is a side of the plain bearing bush, which side faces a lubricant supply. Accordingly, the second shell surface is a side of the plain bearing bush, which side faces away from the lubricant supply. In proper operation, the lubricant can be conducted through the exchange bores from the first to the second shell surface. In proper operation of a plain bearing which is equipped with the claimed plain bearing bush, the lubricating gap of the plain bearing is configured on the second shell surface. A liquid resistance is increased in the lubricant by way of the second diameter of the at least one exchange bore on the second shell surface, as a result of which liquid resistance more lubricant is conveyed into the lubricating gap. The lubricating gap can be configured as an internal lubricating gap and/or as an external lubricating gap. The lubricating film height is increased both in the case of an internal lubricating gap and an external lubricating gap. As a result, the effect of the claimed plain bearing bush is achieved to an increased extent.

Furthermore, the second diameter can be configured by way of a countersunk depression and/or a stepped bore. As a result of a countersunk depression which is of substantially conical configuration, the flow speed of the lubricant can be decreased substantially continuously. Countersunk depressions can be produced precisely and cost-efficiently in a simple way by way of countersink tools. A stepped bore (that is to say, an exchange bore with different diameters in sections) can likewise be produced rapidly and cost-efficiently. Bores of different diameters can be produced with increased precision, with the result that a reduction in the flow speed of the lubricant can be set in a correspondingly precise manner, depending on the ratio between the first and second diameter. The claimed plain bearing bush can therefore be adapted to different applications in a simple way. A countersunk depression on a step or can likewise be combined in order thus to achieve their respective advantages in a combined manner.

In a further embodiment of the claimed plain bearing bush, the second diameter of the replacement ball can correspond to from 1.05 to 6.00 times the first diameter. As a result, an advantageous reduction in the flow speed of the lubricant is achieved on the second shell surface, and a flow resistance is generated. As a result, a corresponding increase in the drag action of the lubricant on the plain bearing bush is in turn brought about. At the same time, a corresponding second diameter provides smooth running for the claimed plain bearing bush, furthermore.

Furthermore, the claimed plain bearing bush can be configured as a floating bush. The floating bush is arranged between a stationary and a rotating component of the plain bearing, and configures an internal lubricating gap and an external lubricating gap between them. As a consequence of the increased drag action which is exerted on the plain bearing bush in proper operation, it follows a rotational movement of the rotating component more rapidly. The lubricating gap height in the internal lubricating gap and/or in the external lubricating gap is thus increased, and therefore also the load-bearing capability of the plain bearing. By virtue of the fact that there are an internal lubricating gap and an external lubricating gap in the case of a floating bush, a particularly increased load-bearing capability is achieved by way of the claimed plain bearing bush. In particular, the damping action in the lubricating gaps is improved, and an improved load distribution is achieved in the case of axial distance deviations. An improved start-up behavior after a standstill is likewise achieved, and the temperature is reduced during operation.

In a further embodiment of the claimed plain bearing bush, the at least one exchange bore comprises an outlet portion which has the second diameter at least in sections. The outlet portion opens on the second shell surface. The outlet portion has a length which is from 10% to 100% of a bore length of the exchange bore. In a manner which corresponds to this, the at least one exchange bore comprises an inlet portion which, starting from the first shell surface, extends through the plain bearing bush and merges into the outlet portion or adjoins the latter. The at least one exchange bore has the first diameter in the inlet portion. The longer the outlet portion, the greater the reduction in the flow speed of the lubricant which can be achieved, and turbulence formation in the lubricant is avoided at the same time. Accordingly, a homogeneous discharge of the lubricant on the second shell surface can be achieved. This applies both to the outlet portions with the second diameter which are configured by way of a countersunk depression and also those which are configured by way of a stepped bore.

Moreover, the countersunk depression, by way of which the second diameter of the at least one exchange bore is configured, can have an opening angle which is from 45° to 135°. As a result, a particularly advantageous reduction in the flow speed of the lubricant is achieved. Opening angles of this type can be produced rapidly and cost-efficiently in a simple way by way of correspondingly shaped countersink tools.

The addressed object on which the invention is based is also achieved by way of a plain bearing according to the invention. The plain bearing comprises a rotating component which is arranged rotatably on a plain bearing bush. The plain bearing likewise comprises a stationary component. The plain bearing bush is configured according to the invention in accordance with one of the embodiments shown above. As a result of the use of a plain bearing bush of this type, the plain bearing has an increased load-bearing capability. In particular, the claimed plain bearing can have a Sommerfeld number of from 0.10 to 10.00. The claimed plain bearing therefore provides a load-bearing capability and as a consequence also a load-bearing capability reserve which opens up challenging fields of application, for example in planetary transmissions of rock crushers or cement mills.

Furthermore, the object outlined at the outset is achieved by way of a planetary transmission according to the invention. The planetary transmission comprises a planetary carrier, to which a plurality of planetary gears are attached rotatably. Here, the planetary gears are mounted rotatably on the planetary carder in each case by means of a plain bearing. According to the invention, at least one of the plain bearings is configured in accordance with the embodiments shown above.

The addressed object on which the invention is based is likewise achieved by way of a wind power plant according to the invention. The wind power plant comprises a nacelle, on which a multiple-blade rotor is arranged rotatably. A drive train is arranged in the nacelle, to which drive train a planetary transmission belongs which is connected in a torque-transmitting manner to the multiple-blade rotor and a generator. According to the invention, the planetary transmission is configured in accordance with one of the embodiments specified above.

The addressed object is likewise achieved by way of an industrial application according to the invention which comprises a drive unit and an output unit. The drive unit and the output unit are connected to one another in a torque-transmitting manner via a planetary transmission. The drive unit is, for example, configured as an electric motor, an internal combustion engine or a hydraulic motor, and provides drive power which is to be transmitted via the planetary transmission to the output unit. The output unit can be configured, for example, as a mill, a vertical mill, a sugar mill, a cement mill, a rock crusher, a conveyor belt, a pump, a roller press, a flat conveyor, a tube mill, a rotary kiln, a slewing gear, a stirring unit, a lifting apparatus, a garbage compactor or a car crusher. To this end, the output unit is connected via the planetary transmission to the drive unit. According to the invention, the transmission is configured in accordance with one of the embodiments outlined above. As a result of the claimed plain bearing bush, the planetary transmission according to the invention has an increased load-bearing capacity and reliability. As a result, the maintenance complexity for the planetary transmission is decreased, which in turn increases the economic efficiency of the industrial application according to the invention.

The object described at the outset is likewise achieved by way of a computer program product according to the invention, by way of which an operating behavior of a plain bearing bush in a plain bearing can be simulated. Here, at least one lubricating gap, for example an internal lubricating gap and/or an external lubricating gap, is simulated which is configured on the plain bearing as a result of a rotational movement. Here, in particular, the present lubricating gap height can be simulated in a manner which is dependent on the present operating state. To this end, the computer program product can comprise runnable simulation routines for fluid dynamic mechanisms and data interfaces, via which operating parameters such as a rotational speed, a temperature of the lubricant or radial loading of the plain bearing can be stipulated, or a simulation result can be output. The computer program product comprises a dataset, by way of which at least the plain bearing bush is modeled. According to the invention, the plain bearing bush is configured in accordance with one of the embodiments outlined above. Which load-bearing capability exists in the plain bearing with the plain bearing bush can be predicted or at least have its plausibility tested by means of the computer program product according to the invention. Furthermore, the plain bearing bush according to the invention can be adapted in terms of design by means of the computer program product according to the invention, and the plain bearing can thus be optimized readily. To this end, the computer program product can be configured, for example, as what is known as a digital twin. Digital twins of this type are shown, for example, in laid-open specification US 2017/286572 A1. The disclosure of US 2017/286572 A1 is incorporated in the present application by reference.

BRIEF DESCRIPTION OF THE DRAWING

In the following text, the invention will be explained in greater detail on the basis of individual embodiments in figures. The figures are to be viewed as complementing one another in so far as identical designations in different figures have the same technical meaning. The features of the individual embodiments can also be combined among one another. Furthermore, the embodiments which are shown in the figures can be combined with the features outlined above. In the figures, in detail.

DETAILED DESCRIPTION OF PREFERRED EMBODIMENTS

Figure 1:
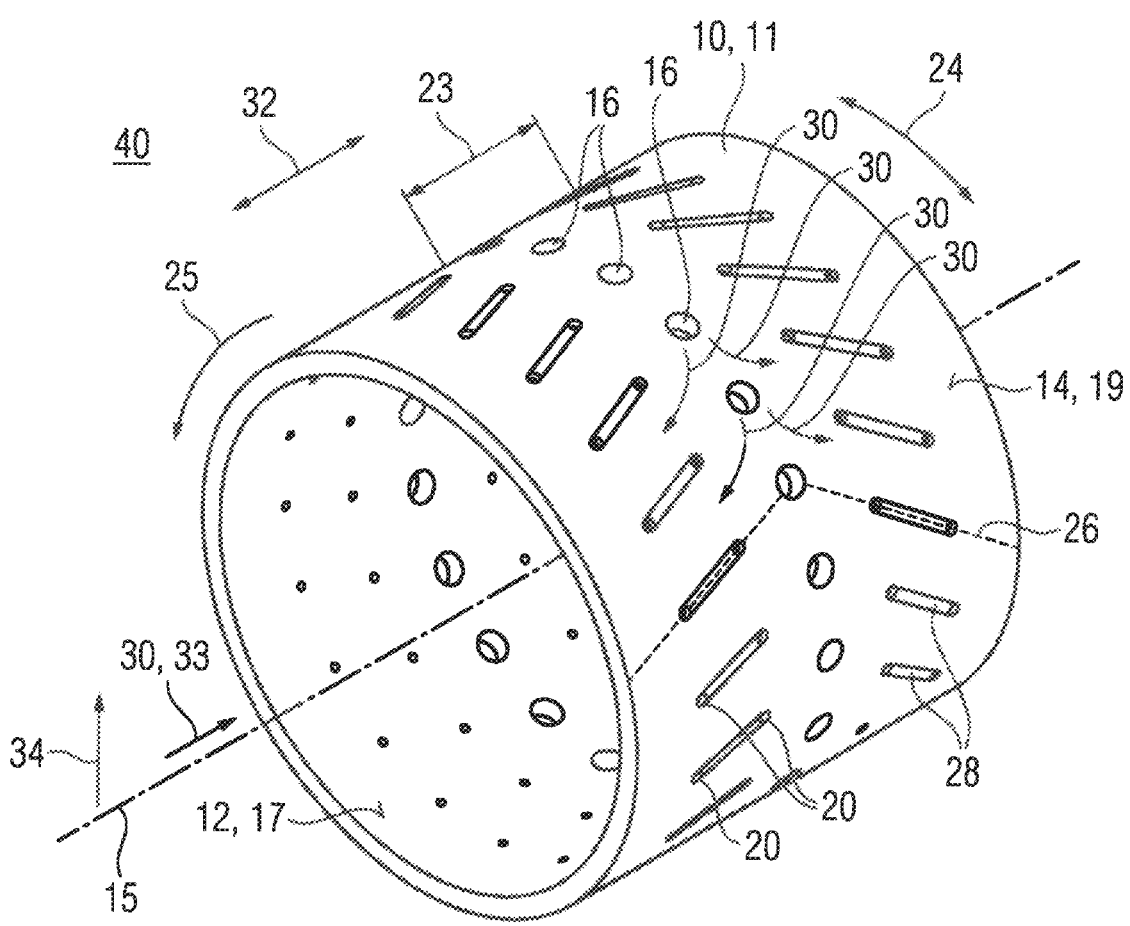
FIG. 1 shows a first embodiment of the claimed plain bearing bush in an oblique view.

FIG. 1 depicts a first embodiment of the claimed plain bearing bush 10. The plain bearing bush 10 comprises a substantially cylindrical main body 11 which has a first shell surface 12 which is configured as an inner surface 17.

Corresponding to this, the plain bearing bush 10 also has a second shell surface 14 which is configured as an outer surface 19. The plain bearing bush 10 can be used in a plain bearing 40, in the operation of which a rotational movement 25 takes place about a main rotational axis 15. The main rotational axis 15 is also an axis of symmetry of the plain bearing bush 10. The plain bearing bush 10 is supplied with lubricant 30 in operation of the plain bearing 40. The lubricant 30 is provided on the side of the first shell surface 12 (that is to say, the inner side 17) via a lubricant supply 33, and is transported via main bores 16 to the second shell surface 14 (that is to say, the outer surface 19). The main bores 16 are configured so as to be spaced apart substantially uniformly and circumferentially on the plain bearing bush 10 in an axially middle region 23. Spaced apart along an axial direction 32, the plain bearing bush 10 has a plurality of exchange bores 20 which have diameters which are overall smaller than the main bores 16. The exchange bores 20 are also configured such that they are spaced apart substantially uniformly in the circumferential direction 24. Furthermore, the exchange bores 20 are arranged in such a way that they configure an arrowhead pattern 26 in interaction with in each case one main bore 16. In a manner which corresponds to the arrowhead pattern 26, two exchange bores 20 on the second shell surface 14 are connected to one another in pairs by way of pocket depressions 28. In operation of the plain bearing 40, the exchange bores 20 are configured to permit a passage of lubricant 30 in the radial direction 34, with the result that the second shell surface 14 is wetted with lubricant 30. The wetting of the second shell surface 14 is assisted by the pocket depressions 28.

Figure 2:
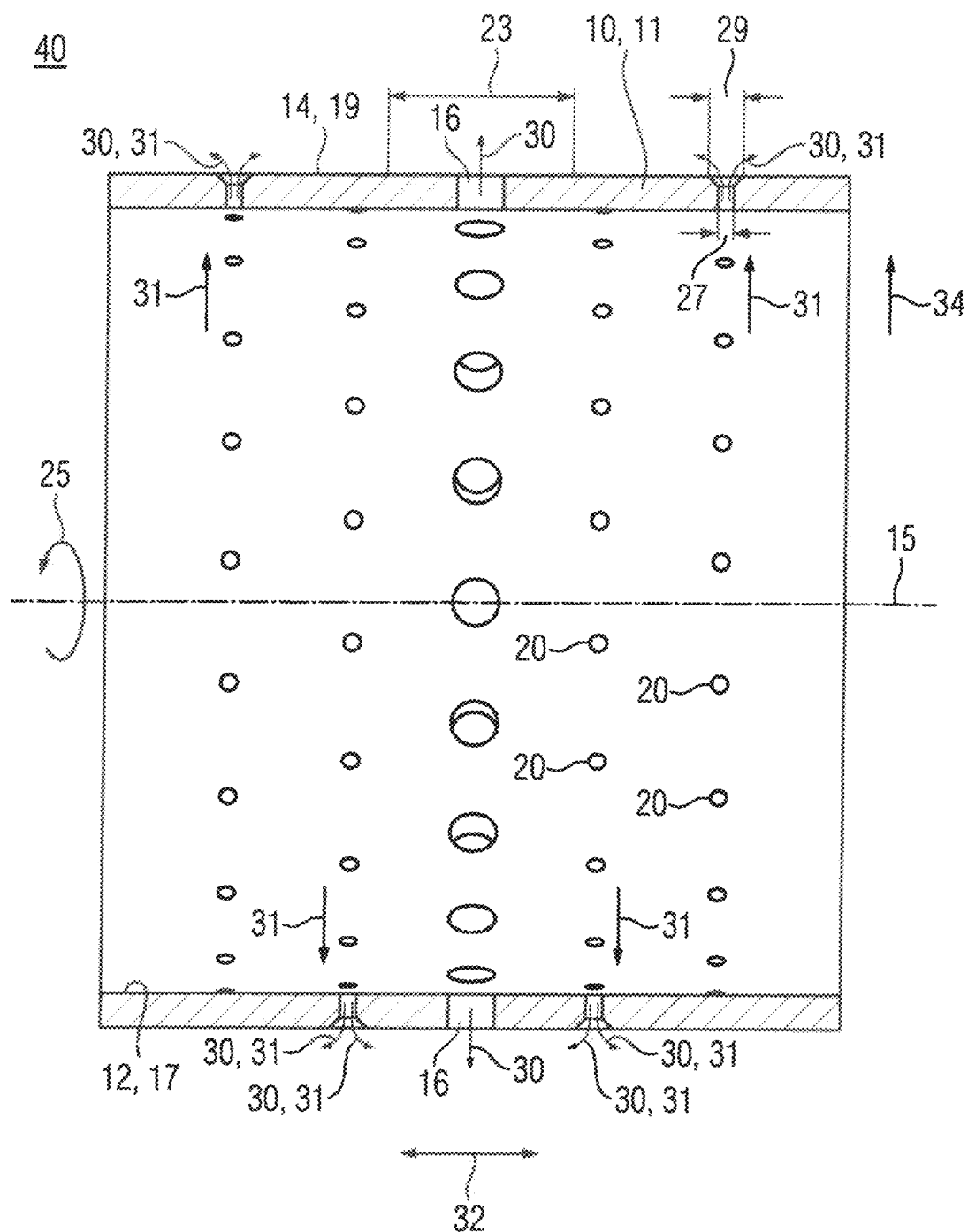
FIG. 2 shows the first embodiment of the claimed plain bearing bush in longitudinal section.

In addition to FIG. 1, FIG. 2 shows the first embodiment of the claimed plain bearing bush 10 in a longitudinal section. On the first shell surface 12, that is to say the inner side 17, at least one of the exchange bores 20 has a first diameter 27, into which the lubricant 30 enters in proper operation of the plain bearing 40. On the second shell surface 14, that is to say the outer surface 19, the at least one exchange bore 20 has a second diameter 29 which is greater than the first diameter 27. A flow speed 31 of the lubricant 30 is decreased during the passage through the at least one exchange bore 20. The differences in the flow speed 31 of the lubricant 30 are illustrated in FIG. 2 by way of arrows of different length. In the region of the second shell surface 14, the at least one exchange bore 20 has a countersunk depression 36, by way of which a flow cross section in the exchange bore 20 is increased, and thus reduces the flow speed 31.

Figure 3:
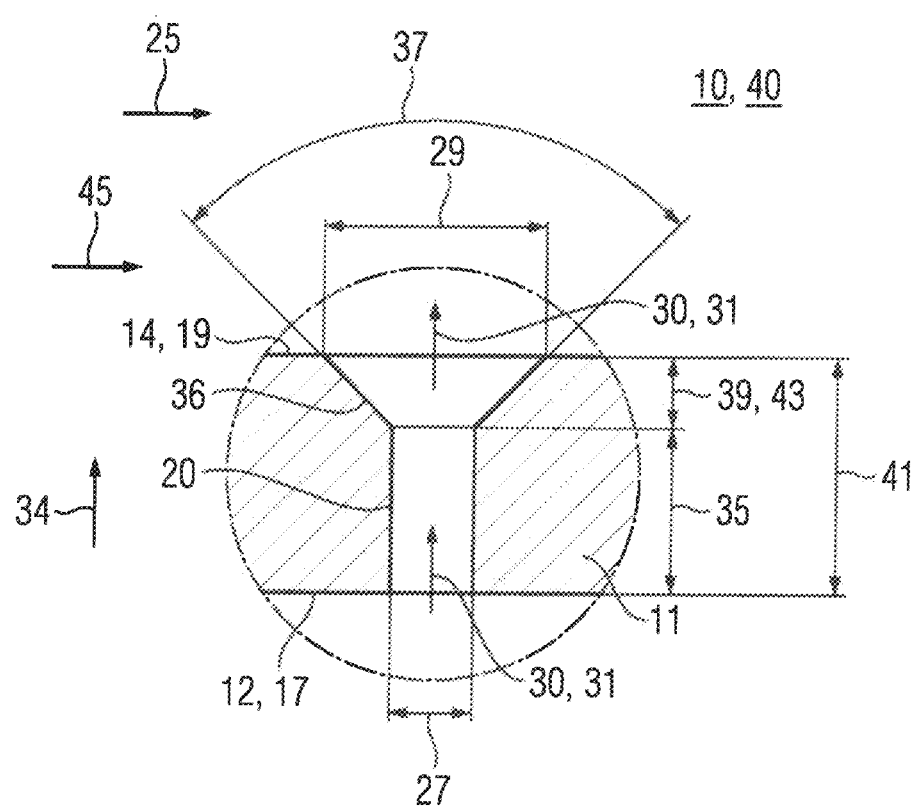
FIG. 3 shows the first embodiment of the claimed plain bearing bush in a sectioned detailed view.

The first embodiment of the claimed plain bearing bush 10 according to FIG. 1 and FIG. 2 is shown in FIG. 3 in a detailed view in a sectional illustration. The exchange bore 20 is configured as a countersunk depression 36, and has an inlet portion 35 with the first diameter 27 and an outlet portion 39 which adjoins it or merges into it and has a second diameter 29 in the region of the second shell surface 14. The length 43 of the outlet portion 39 corresponds to from 10% to 100% of a bore length 41 of the exchange bore 20. The length 43 of the outlet portion 39 is substantially a dimension of the countersunk depression 36 along the radial direction 34. A length 43 of this type of the outlet portion 39 will bring about a sufficient reduction in the flow speed 31 of the lubricant 30, by way of which a drag force 45 is produced on the plain bearing bush 10 on the second shell surface 14. The drag force 45 produces a drag action, by way of which the plain bearing bush 10 follows a rotational movement 25 of the plain bearing 40. An increased drag force 45 is brought about by way of the second diameter 39, the opening angle 37 and the length 43 of the outlet portion 39. The countersunk depression 36 can be produced in a cost-efficient way by means of a countersink tool.

Figure 4:
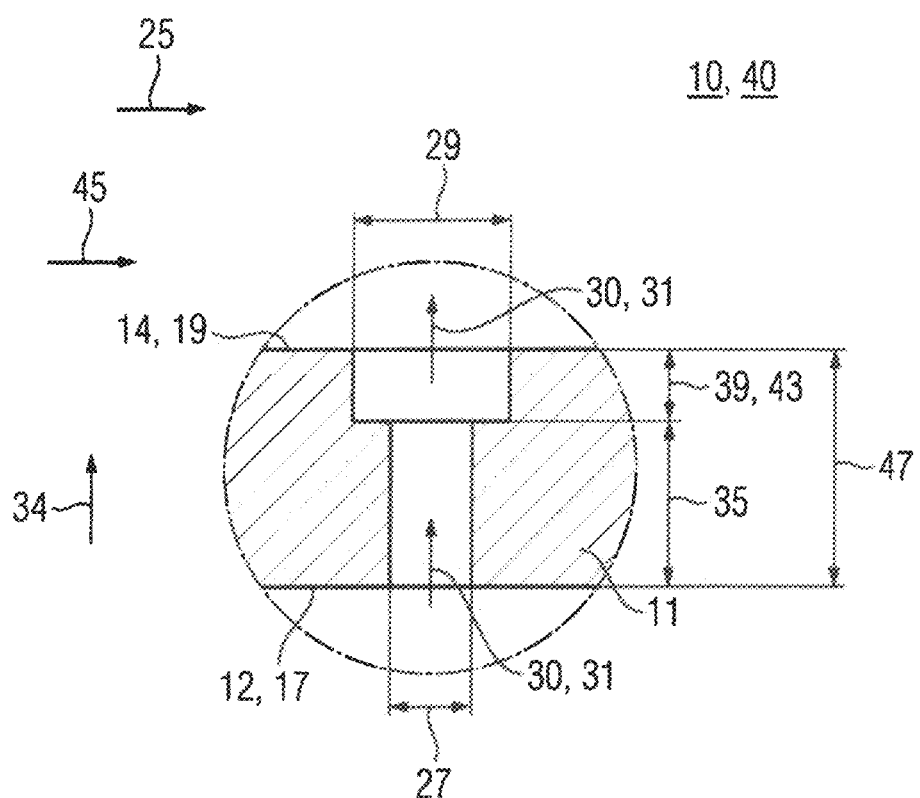
FIG. 4 shows a second embodiment of the claimed plain bearing bush in a sectioned detailed view, FIG. 5 diagrammatically shows a construction of one embodiment of the claimed plain bearing with a plain bearing bush in a third embodiment.

A second embodiment of the claimed plain bearing bush 10 is shown in FIG. 4 in a detailed view in a sectional illustration. The embodiment according to FIG. 4 can also be combined with the embodiment according to FIG. 1, FIG. 2 and FIG. 3. The exchange bore 20 is configured substantially as a stepped bore, and has an inlet portion 35 with the first diameter 27 and an outlet portion 39 which adjoins it or merges into it with the second diameter 29. The length 43 of the outlet portion 39 corresponds to from 10% to 100% of a bore length 47 of the exchange bore 20. The length 43 of the outlet portion 39 is substantially a dimension of the stepped bore along the radial direction 34. A length 43 of this type of the outlet portion 39 will bring about a sufficient reduction in the flow speed 31 of the lubricant 30, by way of which a drag force 45 is produced on the plain bearing bush 10 on the second shell surface 14. The drag force 45 brings about a drag action, by way of which the plain bearing bush 10 follows a rotational movement 25 of the plain bearing 40. An increased drag force 45 is brought about by way of the second diameter 39 and the length 43 of the outlet portion 39.

Figure 5:
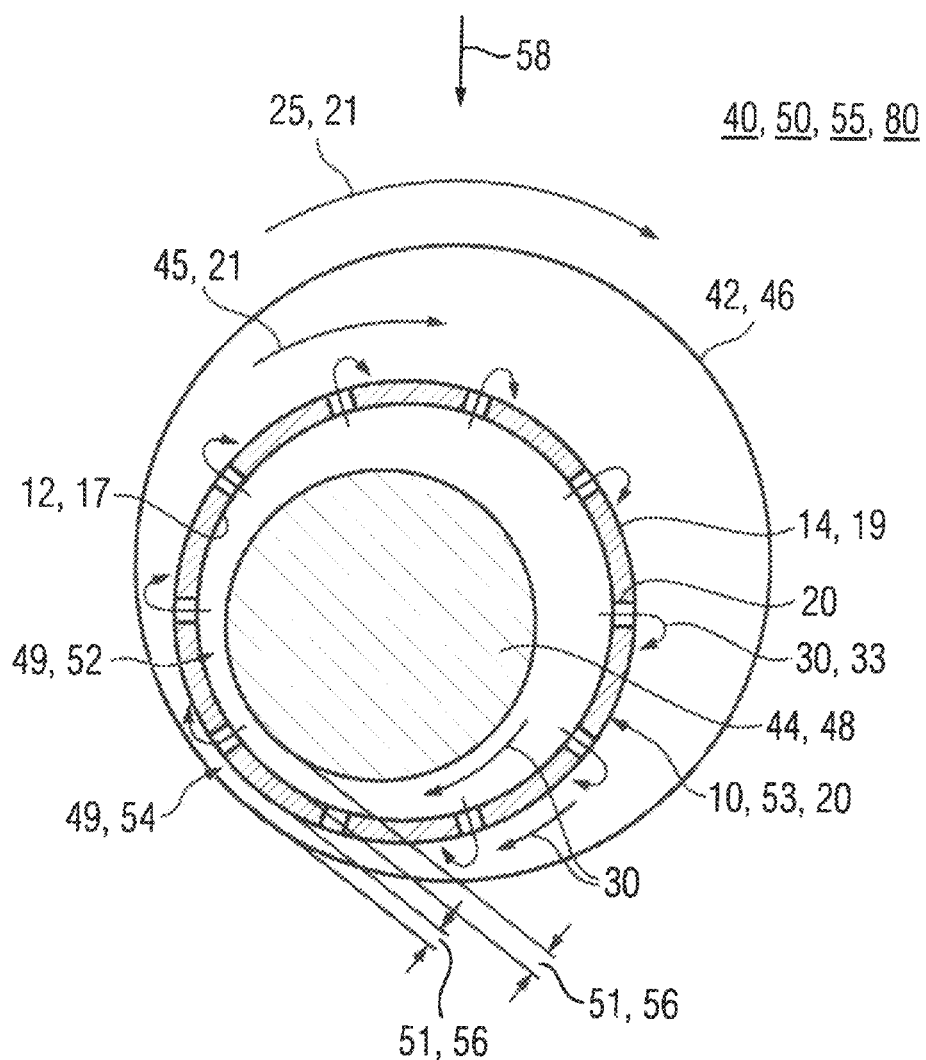

FIG. 5 diagrammatically shows one embodiment of the claimed plain bearing 40 in cross section which is used in a planetary transmission 50 (not shown in greater detail). As rotating component 42, the plain bearing 40 comprises a planetary gear 46 which is arranged rotatably on a planetary carrier 55 of the planetary transmission 50. Furthermore, as stationary component 44, the plain bearing 40 comprises an axle 48 which is connected fixedly to the planetary carrier 55 for conjoint rotation. Lubricant 30 is transported via a lubricant supply 33 to the plain bearing 40 by way of the stationary component 44. The lubricant supply 44 is configured as lubricant channels (not shown in greater detail). The plain bearing 40 also comprises a plain bearing bush 10 which is configured as a floating bush 53. The plain bearing bush 10 is arranged between the stationary component 44 and the rotating component 42, with the result that a lubricant gap 49 can be formed in each case in pairs between them. By way of a rotational movement 25 of the rotating component 42, lubricant 30 is conveyed into an external lubricating gap 54 between the plain bearing bush 10 and the rotating component 42. A lubricating gap height 51 is produced at the external lubricating gap 54 in a manner which is dependent on the speed of the rotational movement 25. The plain bearing bush 10 is provided with exchange bores 20, through which lubricant 30 exits in the region of the external lubricating gap 54. As a result, a drag force 45 (that is to say, a drag action) is exerted on the plain bearing bush 10, with the result that the plain bearing bush 10 follows the rotational movement 25 of the rotating component 42 more closely. The plain bearing bush rotational speed 18 which results in this way is lower than a rotational speed 21 of the rotating component 42. An internal lubricating gap 52 is formed between the stationary component 44 and the plain bearing bush 10, which internal lubricating gap 52 has a lubricating gap height 51 in a manner which is dependent on the plain bearing bush rotational speed 21. The plain bearing bush 10 is provided with exchange bores 20, as shown in FIG. 3 or FIG. 4, with the result that an increased drag force 45 is exerted in the external lubricating gap 54 on the plain bearing bush 10 in proper operation of the plain bearing 40. As a consequence of this, the lubricating film height 51 is increased at the external lubricating gap 54 and/or at the internal lubricating gap 52. The higher the lubricating gap height 51 at the internal lubricating gap 52 and/or at the external lubricating gap 54, the higher a load-bearing capability 56 of the plain bearing 40. The load-bearing capability 56 is a measure of what radial loads 58 in terms of magnitude can load the plain bearing 40 in proper use. The load-bearing capability 56 of the plain bearing 40 is increased by way of the claimed plain bearing bush 10 which is configured as a floating bush 53. The same effect as in the case of the external lubricating gap 54 can also be achieved in the case of the internal lubricating gap 52 if the flow direction of the lubricant 30 is temporarily reversed. Furthermore, the plain bearing bush 10 is modeled in a computer program product 80 which is configured to simulate the operating behavior of the plain bearing bush 10 in operation of the plain bearing 40.

Figure 6:
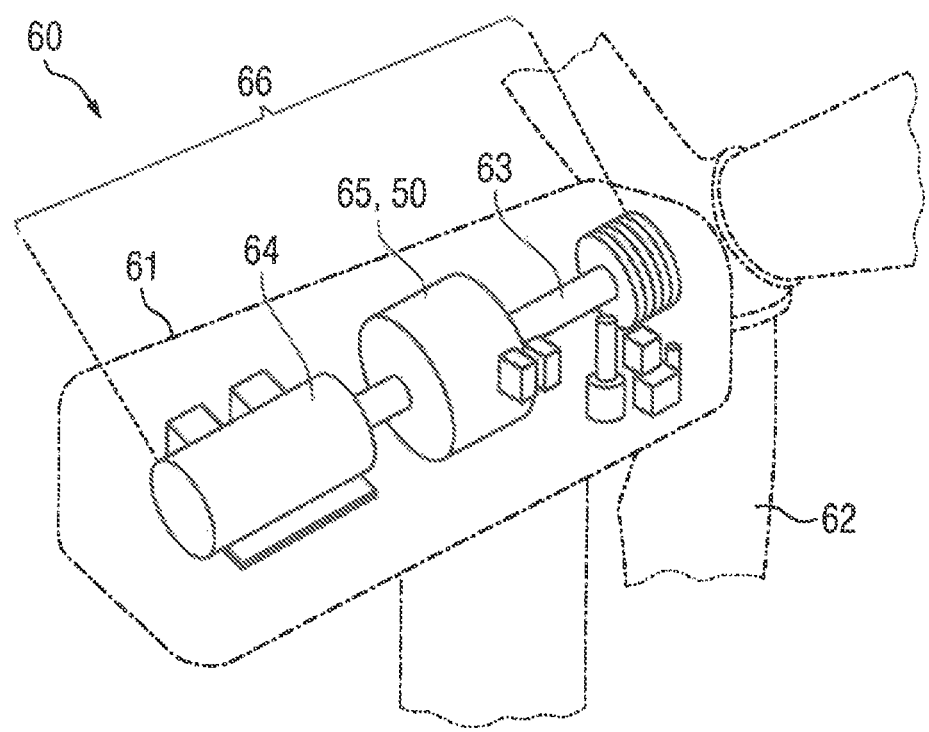
FIG. 6 shows the construction of one embodiment of the claimed wind power plant in a sectioned oblique view.

FIG. 6 shows a sectioned oblique view of one exemplary embodiment of the claimed wind power plant 60 which comprises a nacelle 61, to which a multiple-blade rotor 62 is attached rotatably. A drive train 66 of the wind power plant 60 is received in the nacelle 61, which drive train 66 comprises a main shaft 63 which is connected in a torque-transmitting manner to the multiple-blade rotor 62. The drive train 66 also comprises a generator 64 which is connected via a transmission 65 in a torque-transmitting manner to the main shaft 63. Here, the transmission 65 is configured as a planetary transmission 50 in accordance with one of the above-described embodiments.

Figure 7:
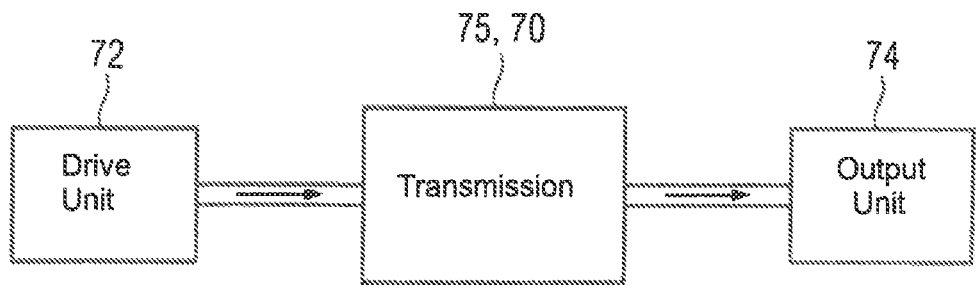
FIG. 7 shows the construction of one embodiment of the claimed industrial application.

One embodiment of the claimed industrial application 70 is shown diagrammatically in FIG. 7. The industrial application 70 comprises an output unit 72 which can be configured, for example, as an electric motor, a wind power plant, an internal combustion engine or a hydraulic motor. The drive power (that is to say, a rotational movement 25) is provided by way of the drive unit 72, which drive power is fed to a transmission 75. The drive power is fed to an output unit 74 with conversion of the present rotational speed and the present torque. The output unit 84 can be configured, for example, as a mechanical application, with the result that the industrial application 70 is configured as a mill, a vertical mill, a sugar mill, a cement mill, a rock crusher, a conveyor belt, a pump, a roller press, a flat conveyor, a tube mill, a rotary kiln, a slewing gear, a stirring unit, a stirred comminutor, a lifting apparatus, a garbage compactor or a car crusher. According to the invention, the transmission 75, via which the drive unit 72 is connected to the output unit 74, is configured as a planetary transmission 50 in accordance with one of the embodiments outlined above. Accordingly, the transmission 75 is provided with at least one plain bearing 40 in accordance with one of the embodiments shown above, and has a plain bearing bush 10 in accordance with at least one of the above-described embodiments.

What is claimed is:

1. A plain bearing bush, comprising a cylindrical main body having a first shell surface and a second shell surface, said first and second shell surfaces including a plurality of exchange bores for a lubricant, at least one of the exchange bores having a first diameter on the first shell surface and a second diameter on the second shell surface, with the second diameter being greater than the first diameter for an increase in a load-bearing capability of the plain bearing bush, wherein two of the exchange bores are arranged in axial spaced-apart relation and connected to one another by a pocket depression.

2. The plain bearing bush of claim 1, wherein the first shell surface is a side of the plain bearing bush which side faces a lubricant feed.

3. The plain bearing bush of claim 1, wherein the second diameter of the at least one of the exchange bores is formed by a countersunk depression and/or a stepped bore.

4. The plain bearing bush of claim 1, wherein the countersunk depression has an opening angle of from 45° to 135°.

5. The plain bearing bush of claim 1, wherein the pocket depression runs in a beveled manner with respect to an axial direction and with respect to a circumferential direction of the main body on a substantially constant radius with respect to an axial center line of the main body.

6. The plain bearing bush of claim 1, further comprising a plurality of said pocket depression arranged in a circumferential arrowhead pattern and/or zigzag pattern.

7. The plain bearing bush of claim 1, wherein the second diameter corresponds to from 1.05 times to 6.00 times the first diameter.

8. The plain bearing bush of claim 1, configured as a floating bush.

9. The plain bearing bush of claim 1, wherein the at least one of the exchange bores includes an outlet portion having the second diameter and configured from 10% to 100% of a bore length of the at least one of the exchange bores.

10. A plain bearing, comprising:
a stationary component; and
a plain bearing bush arranged on the stationary component and comprising a cylindrical main body having a first shell surface and a second shell surface, said first and second shell surfaces including a plurality of exchange bores for a lubricant, at least one of the exchange bores having a first diameter on the first shell surface and a second diameter on the second shell surface, with the second diameter being greater than the first diameter for an increase in a load-bearing capability of the plain bearing bush, wherein two of the exchange bores are arranged in axial spaced-apart relation and connected to one another by a pocket depression; and
a rotating component attached rotatably on the plain bearing bush.

11. The plain bearing of claim 10, wherein the plain bearing has a Sommerfeld number of from 0.10 to 10.00.

12. A planetary transmission, comprising:
a planetary carrier;
a plurality of planetary gears; and
a plain bearing configured to rotatably arrange each of the plurality of planetary gears in the planetary carrier, said plain bearing configured as set forth in claim 10.

13. The planetary transmission of claim 12, wherein the plain bearing has a Sommerfeld number of from 0.10 to 10.00.

14. A wind power plant, comprising a nacelle including a generator and a transmission connected in a torque-transmitting manner to the generator, said transmission being configured as a planetary transmission as set forth in claim 12.

15. An industrial application, comprising: a drive unit; an output unit; and a transmission connecting the drive unit to the output unit, said transmission being configured as a planetary transmission as set forth in claim 12.

16. A computer program product embodied on a non-transitory computer readable medium comprising commands which, when executed by a computer, cause the computer to simulate an operating behavior of a plain bearing bush arranged in a plain bearing, said plain bearing bush comprising a cylindrical main body having a first shell surface and a second shell surface, said first and second shell surfaces including a plurality of exchange bores for a lubricant, at least one of the exchange bores having a first diameter on the first shell surface and a second diameter on the second shell surface, with the second diameter being greater than the first diameter for an increase in a load-bearing capability of the plain bearing bush, wherein two of the exchange bores are arranged in axial spaced-apart relation and connected to one another by a pocket depression.

\* \* \* \* \*